(12) United States Patent
Chang et al.

(10) Patent No.: US 8,411,110 B2
(45) Date of Patent: Apr. 2, 2013

(54) INTERACTIVE IMAGE AND GRAPHIC SYSTEM AND METHOD CAPABLE OF DETECTING COLLISION

(75) Inventors: Chia-Ching Chang, Taichung (TW); Chien-Chung Lin, Kaohsiung (TW)

(73) Assignee: Sunplus Mmobile Inc., Hsinchu (TW)

( * ) Notice: Subject to any disclaimer, the term of this patent is extended or adjusted under 35 U.S.C. 154(b) by 845 days.

(21) Appl. No.: 12/149,483

(22) Filed: May 2, 2008

(65) Prior Publication Data

US 2008/0273041 A1    Nov. 6, 2008

(30) Foreign Application Priority Data

May 4, 2007    (TW) ................................ 96115837 A

(51) Int. Cl.
*G09G 5/00*     (2006.01)
*G09G 5/02*     (2006.01)
*G06F 13/00*    (2006.01)
(52) U.S. Cl. .......................... 345/629; 345/536; 345/604
(58) Field of Classification Search .................. 345/530, 345/536, 592, 604, 629
See application file for complete search history.

(56) References Cited

U.S. PATENT DOCUMENTS

| | | | |
|---|---|---|---|
| 6,111,584 A * | 8/2000 | Murphy | 345/582 |
| 2005/0212784 A1* | 9/2005 | Wang | 345/204 |
| 2006/0125962 A1* | 6/2006 | Shelton et al. | 348/588 |
| 2007/0115288 A1* | 5/2007 | Cronin et al. | 345/473 |

* cited by examiner

*Primary Examiner* — Joni Richer
(74) *Attorney, Agent, or Firm* — Bacon & Thomas, PLLC

(57) ABSTRACT

The present invention relates to an interactive image and graphic system and method capable of detecting collision. A storage device stores a plurality of image data streams. Each image data stream includes a header, which has at least one position coordinate field, and the at least one position coordinate field corresponds to at least one object of the image data stream. An image engine plays a first image data stream of the plurality of image data streams. A graphic engine receives a sprite picture data. The sprite picture data includes a sprite position coordinate. The graphic engine receives the header of the first image data stream. When the sprite position coordinate superimposes over a position coordinate of the at least one object of the first image data stream, the graphic engine drives the image engine to select a second image data stream from the storage device for being played.

12 Claims, 3 Drawing Sheets

INTERACTIVE IMAGE AND GRAPHIC SYSTEM AND METHOD CAPABLE OF DETECTING COLLISION

BACKGROUND OF THE INVENTION

1. Field of the Invention

The present invention relates to the technology field of 2-D image and graphic and, more particularly, to an interactive image and graphic system and method capable of detecting collision.

2. Description of Related Art

In a TV game, generally a graphic engine is used to execute a drawing procedure of a background picture and a sprite for being displayed on a display monitor. The graphic engine can receive an input from a user, so as to control the sprite on the display monitor, thereby achieving the effect of interactive entertainment. Since users have higher and higher expectation to the image quality, the quality of a background picture drawn by a graphic engine could not meet the requirement of user anymore.

In order to solve the above problem, a known art utilizes a MPEG4 decoder to play a background image animation, and utilizes a graphic engine to execute the drawing procedure of the sprite. However, the colors of general image animations are basically in YUV format, while the image animation is decoded by the MPEG4 decoder and saved in a frame buffer by means of a frame form. Then, frames would be read one by one from the frame buffer for being played. At this time, the frames saved in the frame buffer are in YUV format. If an OSD process or other image superimposed effects are applied to the frames saved in the frame buffer, the rendering method of the MPEG4 decoder would be damaged thereby resulting in incapability of processing the animation playing procedure.

In order to solve the problem that the MPEG 4 decoder cannot execute the OSD process or other superimposed effects, a known art utilizes a 3D game engine to execute the operations of playing the background image animation, drawing the sprite, executing the background image animation and superimposing the sprite, etc. The 3D game engine provides a visual effect close to an actual view. Therefore, it is suitable for being used in a game platform. However, not only the 3D game engine is very expensive, but also the game manufacturing company could not successfully develop 3D games by the 3D game engine due to a long learning curve. Accordingly, the conventional interactive game image and graphic engine method still needs further improvements.

SUMMARY OF THE INVENTION

One object of the present invention is to provide an interactive image and graphic system and method capable of detecting collision, so as to avoid the problem that a conventional MPEG4 decoder cannot execute an OSD process or other image superimposed effects.

Another object of the present invention is to provide an interactive image and graphic system and method capable of detecting collision, so as to avoid utilizing an expensive 3D game engine with a long learning curve.

According to one aspect of the present invention, the present invention provides an interactive image and graphic system capable of detecting collision, which comprises a storage device, an image engine and a graphic engine. The storage device stores a plurality of image data streams. Each of the image data stream includes a header, the header has at least one position coordinate field, and the at least one position coordinate field corresponds to at least one object of the image data stream. The image engine is coupled to the storage device, and is used for playing a first image data stream of the plurality of image data streams. The graphic engine receives a sprite picture data. The sprite picture data includes a sprite position coordinate. The graphic engine is coupled to the storage device and the image engine for receiving a header of the first image data stream. When the sprite position coordinate superimposes over a position coordinate of the at least one object of the first image data stream, the graphic engine drives the image engine to select a second image data stream from the storage device for being played.

According to another aspect of the present invention, the present invention provides a method for detecting collision in an interactive image and graphic system. The image and graphic system has an image engine and a graphic engine. The graphic engine receives a sprite picture data, and the sprite picture data includes a sprite position coordinate. The image engine receives an image data stream of a plurality of image data streams. The image data stream includes a header, the header has at least one position coordinate field, and the at least one position coordinate field corresponds to at least one object of the image data stream. The method comprises the following steps: (A) the graphic engine and the image engine respectively playing the sprite picture data and a first image data stream; (B) the graphic engine receiving a header of the first image data stream; and (C) when the graphic engine determines that the sprite position coordinate superimposes over a position coordinate of the at least one object of the first image data stream, the graphic engine driving the image engine to select a second image data stream from the storage device for being played.

DETAILED DESCRIPTION OF THE PREFERRED EMBODIMENT

Figure 1:
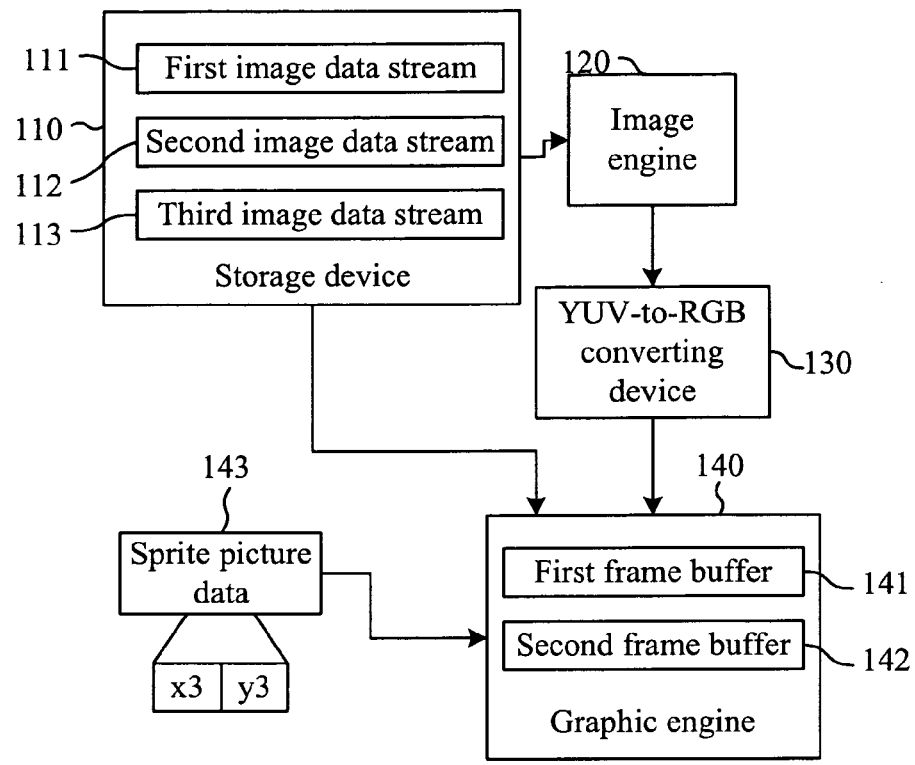
FIG. 1 illustrates a block diagram of an interactive image and graphic system capable of detecting collision according to the present invention.

FIG. 1 illustrates a block diagram of an interactive image and graphic system capable of detecting collision according to the present invention. The interactive image and graphic system includes a storage device 110, an image engine 120, a graphic engine 140 and a YUV-to-RGB converting device 130.

Figure 2:
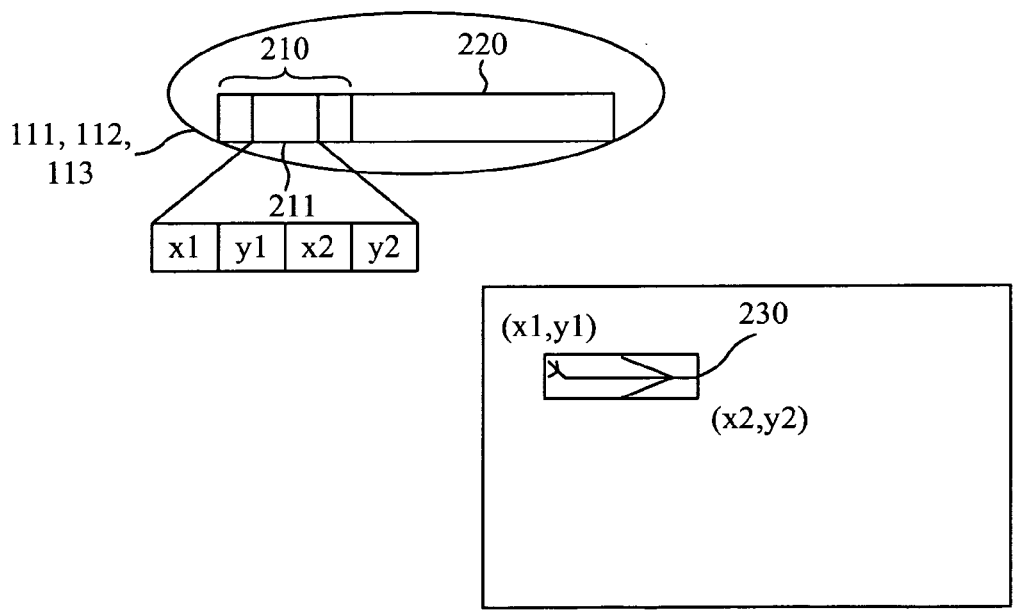
FIG. 2 illustrates a schematic drawing of an image data stream according to the present invention.

The storage device 110 stores a plurality of image data streams. In this embodiment, the storage device 110 stores a first image data stream 111, a second image data stream 112 and a third image data stream 113. As shown in FIG. 2, each image data stream is composed of a header 210 and data 220. The header 210 has at least one position coordinate field 211, and the at least one position coordinate field 211 corresponds to at least one object 230 of the image data stream. In this embodiment, the at least one object 230 could be an airplane, for example. The at least one object 230 is represented as a rectangle. The position coordinate field 211 is recorded with a left-top coordinate position and a right-bottom coordinate position of the rectangle of the at least one object 230. The data 220 is the compressed image data, wherein the compression format could be MPEG1, MPEG2, MPEG4 or H.263.

The storage device 110 could be a dynamic random access memory, which could be an asynchronous dynamic random access memory or a synchronous dynamic random access memory. If the storage device 110 is a synchronous double data rate dynamic random access memory, it could be a DDR-I, DDR-II, DDR-333 or DDR-400.

The image engine 120 is coupled to the storage device 110, and is used for playing a first image data stream 111 of the plurality of image data streams. Since signals decompressed from conventional MPEG or H.263 image data streams are in YUV format, the image engine 120 plays the plurality of image data streams in YUV format.

The YUV-to-RGB converting device 130 is coupled to the image engine 120 and the graphic engine 140, so as to convert the data outputted by the image engine 120 from YUV format to RGB format for being played by the graphic engine 140.

The graphic engine 140 is coupled to the storage device 110 and the YUV-to-RGB converting device 130. The graphic engine 140 has a first frame buffer 141 and a second frame buffer 142. The first frame buffer 141 is used for temporarily storing the data outputted by the YUV-to-RGB converting device 130.

Figure 3:
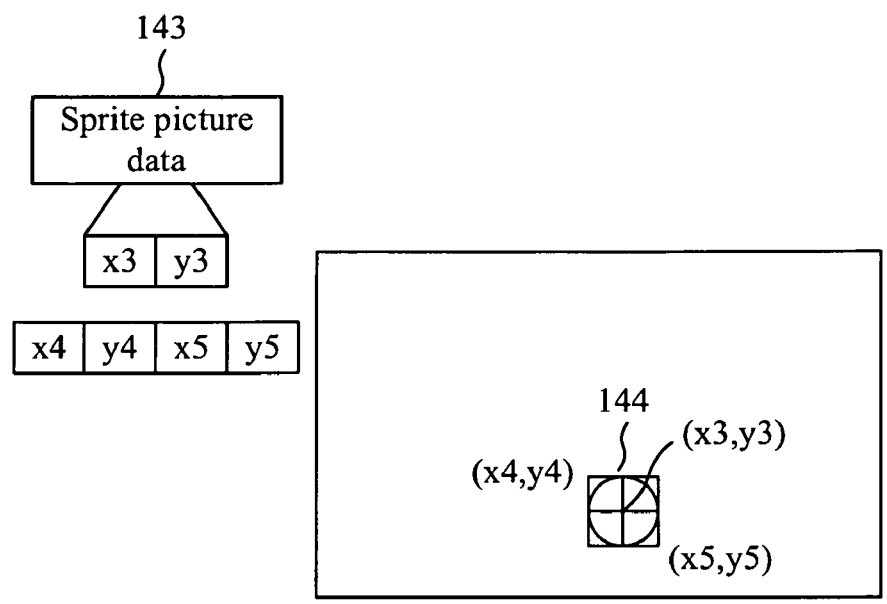
FIG. 3 illustrates a schematic drawing of a sprite picture data according to the present invention.

The graphic engine 140 receives a sprite picture data 143. The sprite picture data 143 is in RGB format and includes a position coordinate of the sprite picture. As shown in FIG. 3, in this embodiment, the sprite picture is a crosshair 144, and the sprite picture position coordinate could be located in the center of the crosshair 144, which is currently represented as (x3, y3). The sprite picture position coordinate could be represented as a rectangle, and the sprite picture position coordinate is recorded with the left-top coordinate position (x4, y4) and the right-bottom coordinate position (x5, y5) of the rectangle of the sprite picture.

The second frame buffer 142 is used for temporarily storing the sprite picture data 143. The graphic engine 140 executes an alpha blending process to the data of the first frame buffer 141 and the data of the second frame buffer 142, so as to superimpose the sprite picture over the first image data stream 111 outputted by the image engine 120 for being outputted.

Figure 4:
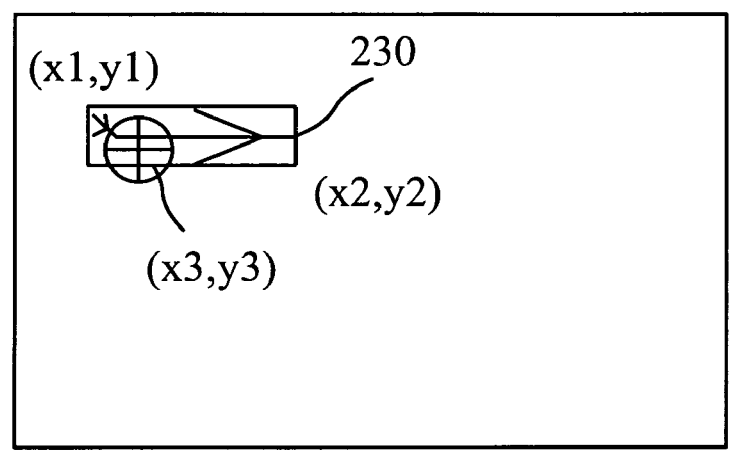
FIG. 4 illustrates a schematic drawing showing the collision generated between the sprite picture and at least one object 230 according to the present invention.
Figure 4:
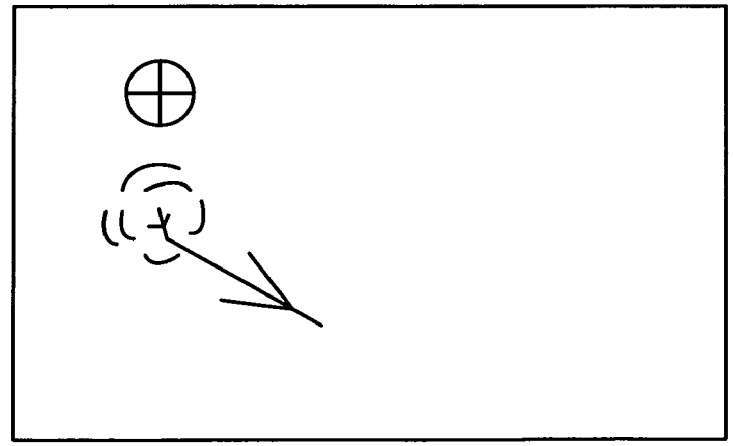

The graphic engine 140 is coupled to the storage device 110 for receiving a header 210 from the first image data stream 111. The graphic engine 140 determines whether the sprite position coordinate superimposes over the position coordinate 211 of the at least one object 230 from the first image data stream 111 by means of two determinations $x1 \leq x3 \leq x2$ and $y1 \leq y3 \leq y2$. As shown in FIG. 4, when the sprite position coordinate superimposes over the position coordinate 211 of the at least one object 230 of the first image data stream 111, the graphic engine 140 determines there is a collision generated between the sprite picture and the picture of the at least one object 230, therefore, the graphic engine 140 drives the image engine 120 to select a second image data stream 112 from the storage device 110 for being played, wherein the second image data stream 112 could be an image data stream relating to an airplane crash, for example.

When the sprite position coordinate does not superimpose over the position coordinate 211 of the at least one object 230 from the first image data stream 111, the image engine 120 could continuously play the first image data stream 111, or the graphic engine 140 drives the image engine 120 to select a third image data stream 113 from the storage device 110 for being played after a predetermined time interval, wherein the third image data stream 113 could be an image data stream of a continuously-flying airplane.

Figure 5:
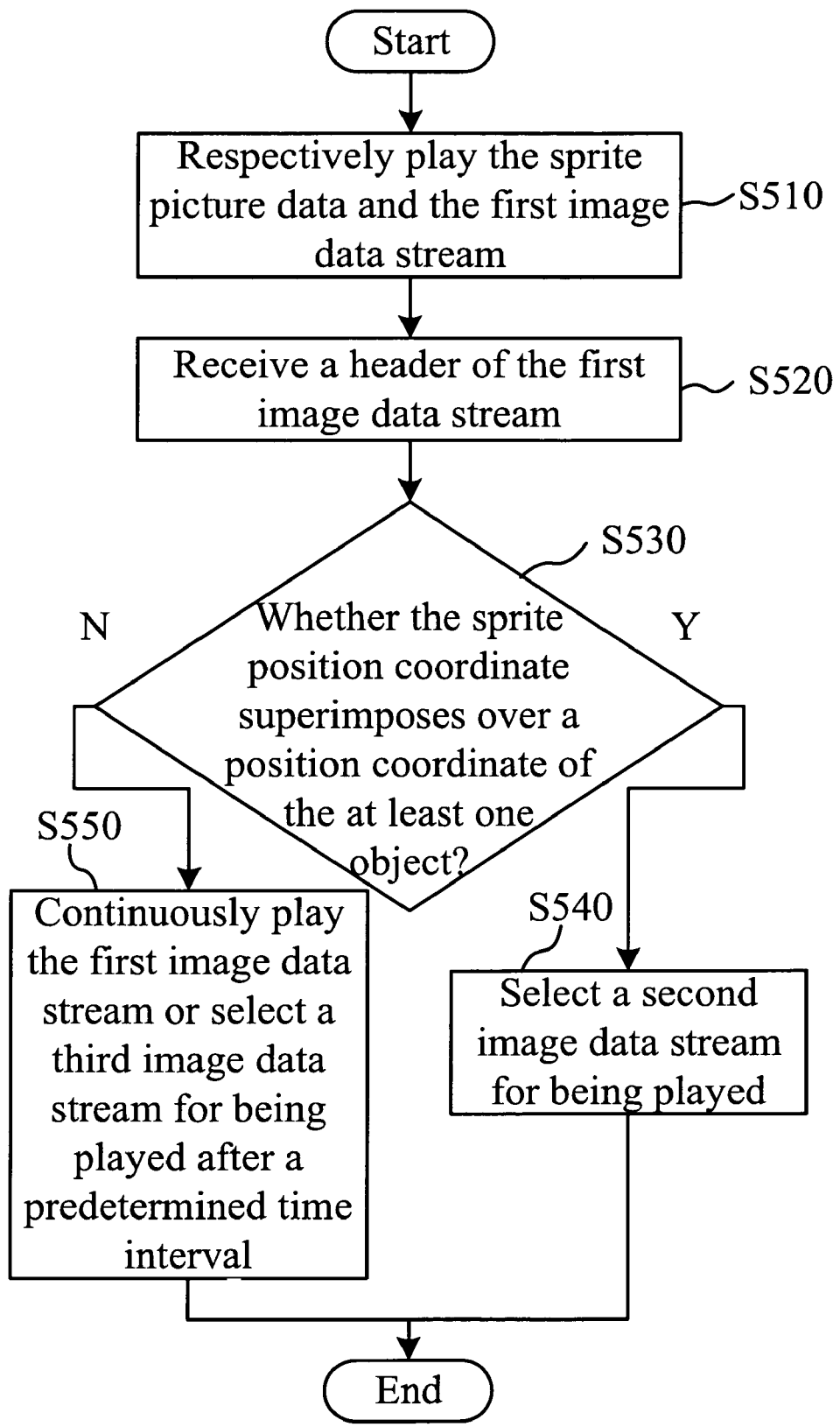
FIG. 5 illustrates a flowchart of a method for detecting collision in the interactive image and graphic system according to the present invention.

FIG. 5 illustrates a flowchart of a method for detecting collision in the interactive image and graphic system according to the present invention. According to the above description, the image and graphic system has an image engine 120 and a graphic engine 140. The graphic engine 140 receives a sprite picture data 143, and the sprite picture data 143 includes a sprite position coordinate. The image engine 120 receives a first image data stream 111 of a plurality of image data streams. The first image data stream 111 includes a header 210, the header 210 has at least one position coordinate field 211, and the at least one position coordinate field 211 corresponds to at least one object 230 of the first image data stream 111.

First, in step S510, the graphic engine 140 and the image engine 120 respectively play the sprite picture data 142 and the first image data stream 111.

In step S520, the graphic engine 140 receives a header 210 of the first image data stream 111.

In step S530, the graphic engine 140 determines whether the sprite position coordinate superimposes over a position coordinate of the at least one object 230 from the first image data stream 111.

When the graphic engine 140 determines that the sprite position coordinate superimposes over the position coordinate of the at least one object 230 from the first image data stream 111, it means a collision is generated between the sprite picture and the picture of the at least one object 230, and then the graphic engine 140 drives the image engine 120 to select a second image data stream 112 for being played (step S540).

When the graphic engine 140 determines that the sprite position coordinate does not superimpose over the position coordinate of the at least one object 230 from the first image data stream 111, it means there is not collision generated between the sprite picture and the picture of the at least one object 230, and then the graphic engine 140 drives the image 120 to continuously play the first image data stream 111, or select a third image data stream for being played after a predetermined time interval (step S550).

According to the above description, the technique of the present invention could be applied in detecting object collision in an image plane and a graphic plane. The image plane is driven by the image engine 120, while the graphic plane is driven by the graphic engine 140. The technique of the present invention could be applied in such as a video subtitle menu, a video interactive commercial, a karaoke menu, and so on.

According to the above description, the present invention executes a superimposed process to video streams and graphics, thereby providing a more vivid visual effect than conventional game images. Meanwhile, a collision determination is processed by detecting whether the sprite position coordinate superimposes over the position coordinate of the at least one object 230, so as to achieve an interactive effect. Further, the problem of utilizing an expensive 3D game engine with a long learning curve could be avoided.

Although the present invention has been explained in relation to its preferred embodiment, it is to be understood that many other possible modifications and variations can be made without departing from the spirit and scope of the invention as hereinafter claimed.

What is claimed is:

1. An interactive image and graphic system capable of detecting collision, comprising:
   a storage device, storing a plurality of MPEG4 image data streams, each said MPEG4 image data stream including a header, wherein the header having at least one position coordinate field corresponding to at least one object of the MPEG4 image data stream, and the at least one position coordinate field is recorded with a left-top coordinate position (x1, y1) and a right-bottom (x2, y2) coordinate position of the at least one object;
   an image engine, coupled to the storage device, for playing a first MPEG4 image data stream of the plurality of MPEG4 image data streams; and
   a graphic engine, coupled to the storage device and the image engine, for receiving a header of the first MPEG4 image data stream and receiving a sprite picture data having a sprite position coordinate (x3, y3), wherein when the sprite position coordinate superimposes over a position coordinate of the at least one object from the first image data stream by means of two determinations $x1 \leq x3 \leq x2$ and $y1 \leq y3 \leq y2$, the graphic engine determines that there is a collision generated between the sprite picture and a picture of the at least one object and thus drives the image engine to select a second MPEG4 image data stream from the storage device for being played, and when the sprite position coordinate does not superimpose over the position coordinate of the at least one object from the first MPEG4 image data stream, the graphic engine drives the image engine to continuously play the first MPEG4 image data stream, or to select a third MPEG4 image data stream from the storage device for being played after a predetermined time interval.

2. The system as claimed in claim 1, wherein the image engine plays the plurality of MPEG4 image data streams in YUV format.

3. The system as claimed in claim 1, wherein the graphic engine plays in RGB format.

4. The system as claimed in claim 3, further comprising:
   a YUV-to-RGB converting device, coupled to the image engine and the graphic engine, so as to convert the data outputted by the image engine from the YUV format to the RGB format for being played by the graphic engine.

5. The system as claimed in claim 4, wherein the graphic engine has a first frame buffer, and the first frame buffer is used for temporarily storing the data outputted by the YUV-to-RGB converting device.

6. The system as claimed in claim 5, wherein the graphic engine has a second frame buffer, and the second frame buffer is used for temporarily storing the sprite picture data.

7. The system as claimed in claim 6, wherein the graphic engine executes an alpha blending process to the first frame buffer and the second frame buffer.

8. A method for detecting collision in an interactive image and graphic system, the image and graphic system having an image engine and a graphic engine, the graphic engine receiving a sprite picture data having a sprite position coordinate (x3, y3), the image engine receiving one of a plurality of MPEG4 image data streams, the MPEG4 image data stream including a header having at least one position coordinate field corresponding to at least one object of the MPEG4 image data stream, and the at least one position coordinate field is recorded with a left-top coordinate position (x1, y1) and a right-bottom (x2, y2) coordinate position of the at least one object, the method comprising the steps of:
   (A) the graphic engine and the image engine respectively playing the sprite picture data and a first MPEG4 image data stream;
   (B) the graphic engine receiving a header of the first MPEG4 image data stream; and
   (C) when the graphic engine determines that the sprite position coordinate superimposes over a position coordinate of the at least one object of the first MPEG4 image data stream and thus determines that there is a collision generated between the sprite picture and a picture of the at least one object by means of two determinations $x1 \leq x3 \leq x2$ and $y1 \leq y3 \leq y2$, the graphic engine driving the image engine to select a second MPEG4 image data stream from the storage device for being played.

9. The method as claimed in claim 8, further comprising the step of:
   (D) when the graphic engine determines that the sprite position coordinate does not superimpose over the position coordinate of the at least one object of the MPEG4 first image data stream, the graphic engine driving the image engine to continuously play the first MPEG4 image data stream, or to select a third MPEG4 image data stream for being played after a predetermined time interval.

10. The method as claimed in claim 8, wherein the image engine plays the MPEG4 image data stream in the YUV format.

11. The method as claimed in claim 10, wherein the graphic engine plays in the RGB format.

12. The method as claimed in claim 11, further comprising the following step:
   a YUV-to-RGB converting step, converting the data outputted by the image engine from the YUV format to the RGB format for being played by the graphic engine.

* * * * *